United States Patent [19]

Vaseen

[11] 4,182,663

[45] Jan. 8, 1980

[54] CONVERTING OXYGEN TO OZONE BY U.V. RADIATION OF A HALOGEN SATURATED HYDROCARBON LIQUID CONTAINING DISSOLVED OR ABSORBED OXYGEN

[76] Inventor: Vesper A. Vaseen, 9840 W. 35th Ave., Wheatridge, Colo. 80033

[21] Appl. No.: 885,956

[22] Filed: Mar. 13, 1978

[51] Int. Cl.$^2$ ............................ B01J 1/10; A61L 1/00
[52] U.S. Cl. ................................ 204/157.1 R; 422/23; 422/29; 210/63 Z
[58] Field of Search .................. 204/157.1 R; 422/21, 422/22, 23; 210/63 Z

[56] References Cited

U.S. PATENT DOCUMENTS

| | | | |
|---|---|---|---|
| 4,008,136 | 2/1977 | Williams | 204/157.1 R |
| 4,141,830 | 2/1979 | Last | 210/63 Z |

Primary Examiner—Howard S. Williams

[57] ABSTRACT

This invention relates to the physical/chemical relationship wherein ultraviolet light energy excites the oxygen molecules to an extent the normal molecular form of oxygen $O_2$ becomes $O_3$ the physical chemical reaction is caused to take place by dissolving oxygen in an inert liquid, such as a fully halogen saturated hydrocarbon liquid, then radiating the absorber liquid with ultraviolet light; thus not only converting the soluble oxygen to ozone but also retaining it in solution in the absorber liquid unit it is desired to be released for useful work of chemical oxidation and/or disinfection.

10 Claims, No Drawings

CONVERTING OXYGEN TO OZONE BY U.V. RADIATION OF A HALOGEN SATURATED HYDROCARBON LIQUID CONTAINING DISSOLVED OR ABSORBED OXYGEN

REFERENCES

Scientific American, Conditions for Life; Aharon Gibor; W. H. Freeman and Company, San Francisco, CA; 1976

| U.S. Pat. No. | | | |
| --- | --- | --- | --- |
| 574,341 | 12/1896 | Pridham | 204/321 |
| 1,074,106 | 9/1913 | Dumars | 204/321 |
| 1,316,342 | 9/1919 | Walden | 204/321 |
| 2,992,540 | 7/1961 | Grosse et. al. | 204/321 |
| 3,186,930 | 6/1965 | Cook | 204/321 |
| 3,342,721 | 9/1967 | Debelius et. al. | 204/321 |
| 3,551,321 | 12/1970 | Guillerd | 204/321 |
| 3,766,051 | 10/1973 | Bollyky | 204/321 |

BACKGROUND OF THE INVENTION

Field of the Invention

Ozone has been called "mother nature's effluent treatment." Ozone ($O_3$) has been used throughout Europe to disinfect and improve the quality of drinking water since 1906. When the first commercial plant for an application of this sort began operating an Nice, France. Several thousand installations are now in operation, the most of which are in Europe. Ozone is used principally in water treatment for disinfection as well as taste and odor enhancement. Present day demands for cleaner effluent streams from Industrial Plants, along with simpler, more efficient means of treating municipal sewage indicate the much greater use of ozone, if its cost of production can be kept competitive with chlorine dioxide, peroxide, and permanganate.

Recent findings that chlorinated water may produce carcinogens with trace hydrocarbons is a further reason to expand the use of ozone as a disinfectant and sterilant.

OZONE

Pure ozone is a toxic, bluish, unstable, potentially explosive gas under refrigeration a dark blue liquid. The chemical/physical characteristics are:

| PHYSICAL CONSTANTS | |
| --- | --- |
| (Formula: $O_3$) | |
| Molecular Weight | 47.9982 |
| Boiling Point @ 1 atm. | $-169.4°$ F. ($-111.9°$ C.) |
| Freezing Point @ 1 atm. | $-314.5°$ F. ($-192.5°$ C.) |
| Density, Gas @ $0°$ C., 1 atm. | 2.143 g./l. |
| Density, Liquid @ $-183°$ C. | 1.571 g./ml. |
| Critical Temperature | $10.2°$ F. ($-12.1°$ C.) |
| Critical Pressure | 802.5 p.s.i.a. (54.6 atm.) |
| | (56.4 kg./cm.$^2$ absolute) |
| Viscosity, Liquid @ $-183°$ C. | 1.57 centipoises |
| Latent Heat of Vaporization @ b.p. | 3410 kcal./mole |
| Surface Tension @ $-183°$ C. | 38.4 dynes/cm. |
| Dielectric Constant, Liquid @ $-183°$ C. | 4.79 |
| Dipole Moment | 0.55 D. |
| Solubility in Water @ $0°$ C., 1 atm. | 0.494 volume/volume water |

At the present time nongaseous ozone is supplied dissolved in chlorotrifluoromethane ("Freon 13") in stainless steel cylinders. These solutions can be handled safely at vapor phase concentrations up to 20% by volume of ozone. The cylinder pressure is about 475 p.s.i.g at $20°$ C. and about 110 p.s.i.g at $-60°$ C.

Ozone can be supplied dissolved in a "Freon 13" solvent with an initial concentration of 50 liters of gaseous ozone (at S.T.P.) per liter of solution. The solutions contain trace amounts of oxygen, which accumulate slowly with ozone decomposition.

HANDLING AND STORAGE

Ozone is supplied to users dissolved in "Freon-13" which decreases, the hazards of handling and using the gas. Since ozone is a gas which has a tendency to decompose, it is essential that the container be stored at low temperatures to decrease the amount of decomposition. To effect this low temperature storage during delivery the cylinder is packed with dry ice in an insulated container which is capable of maintaining low temperatures for approximately 5 days.

Upon receipt of the ozone package it is recommended that a fresh charge of dry ice be put around the cylinder and the unit recharged periodically until the ozone has been expended or the experiment complete. The ozone cylinder can also be stored in a laboratory deep freeze or dry ice chest.

(NOTE: Permitting the ozone to warm up unnecessarily is not a hazard, but will only result in a more rapid decomposition of the ozone, with the half-life being about 3 days

| Temperature | Approximate Half-Life of Ozone |
| --- | --- |
| $20°$ C. | 3 days |
| $-15°$ C. | 8 days |
| $-25°$ C. | 18 days |
| $-50°$ C. | 3 months |

MATERIALS OF CONSTRUCTION

The preferred materials of construction are: glass, stainless steel, Teflon, Del-F, viton or hypalon, aluminum, tygon, polyvinyl chloride and polyethylene. The use of copper and copper alloys should be avoided because these materials act as a catalyst to promote decomposition. Rubber or any composition thereof is unsuitable. Extreme precaution should be taken to avoid contact with oil, grease or other readily combustible substances.

COMMERCIAL PREPARATION

Ozone is produced by passing a stream of oxygen or air through a generator in which it is subjected to an electrical discharge.

MOLECULAR STRUCTURE

The ozone molecule is angular, with an O—O—O angle of 116°49'±30' and O—O bond distances of 1.278±0.003 A. The structure involves resonance among the four structures shown, the first two predominating.

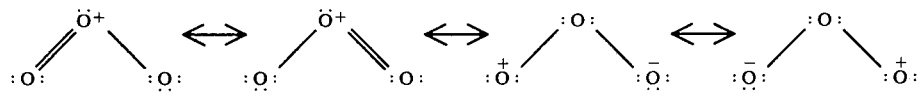

CHEMICAL PROPERTIES

Ozone is second only to fluorine in its oxidizing power. It oxidizes most inorganic compounds to their final oxidation state.

INDUSTRIAL OZONE

Industrail ozone has until this invention not been generated, dissolved in a solvent as above and chilled till use, but rather is an unstable gas considerably diluted with air or oxygen. From a practical standpoint, it was uneconomical or harzardous to concentrate, ship, and store; it should be produced and used as needed. The most economical means of producing ozone in quantity until this invention was by passing air or oxygen through a high voltage electrical discharge in a machine called an ozonator. Ozone can be generated from air or from oxygen. However, most ozonators will yield much more ozone when fed with oxygen.

Within limits the concentration of ozone (normally 1 or 2%) can be increased by simply reducing the gas flow through the ozonator; unfortunately, this is accomplished at the cost of a loss in overall production. The higher one tries to make the ozone concentration, the less ozone one gets per hour from the ozonator. Ozone concentrations of 5% (in air) or 10% (in oxygen) are possible but usually are uneconomical. The yield drops to zero slightly above these limits. The explanation is that the electric discharge not only produces ozone $$3O_2 \rightarrow 2O_3$$

but also can destroy it $$2O_3 \rightarrow 3O_2$$

the velocity of the reverse reaction increasing with the ozone concentration.

OZONE GENERATION BASICS

When high voltage AC is imposed across a discharge gap in the presence of an oxygen containing gas, ozone is produced. This basic method of production is inherently inefficient. About 10% of the energy supplied is used in production or conversion of oxygen to (1%) ozone. The 90% is lost as light, sound and primarily heat.

The decomposition of ozone back to oxygen is greatly accelerated with increasing temperature, so that all high concentration ozonators must contain a heat removal method.

The gas flow through the gap removes only enough heat to allow production of ozone in concentrations of less than a few tenths of a percent. Ozone production in higher concentrations must be provided a heat removal means.

Ozone is also produced with the photolysis of oxygen molecules ($O_2$) which occurs when oxygen strongly absorbs ultraviolet radiation with a wavelength of 255 nanometers. The oxygen atoms released react with other oxygen molecules to produce ozone.

Light acts as though it were composed of small packets of energy called quant or photons. Each photo has the energy content: $E = hc/\lambda$. The h is Planck's universal constant of action ($1.58 \times 10^{-34}$ calorie seconds). The c is the velocity of light ($3 \times 10^{10}$ centimeters per second in empty space). The $\lambda$ is the wave length.

In the realm of chemistry the most useful unit for measuring the work that light does is the "Einstein," the energy content of one mole of quanta ($6.02 \times 10^{23}$ quanta). One molecule is exited to enter into a chemical reaction by absorbing one quantum of light; so one mole of molecules can be activated by absorbing one mole of quanta. The energy content of one Einstein is equal to $2.854 \times 10^7$ gram calories, divided by the wave length of the photon expressed in milimicrons.

Most chemical reactions involve energies of actuation between 15 and 65 kilogram calories (kilocalories) per mole. This is equivalent energetically to radiation wavelengths between 1,900 and 440 millimicrons.

DESCRIPTION OF PRIOR ART

The basic elements of an ozonation system are an ozone generator and a mixing tank or column.

The heart of the generator is the ozone producer consisting of a pair of large-area electrodes, either flat or concentric tubular, separated by an air gap and a presence of a high-voltage, high frequency silent electric discharge, or corona. Ozone is generated from oxygen in the gap between the electrodes. Most generating units are designed to operate in the 5000 to 25,000 volt range, and at frequencies up to 1000, or more $H_z$.

Many of the operating problems encountered in this type equipment is the heat in the generating area, along with accumulations of nitric acid and nitrogen oxides which occur as by-products of ozone generation from air having a dew point above −40° C. Use of air not only requires drying prior to introduction to the generator, but decreases the oxygen conversion to ozone to 50% of that produced when pure oxygen is used.

Several imporvements have been developed in the generation of ozone. Acid-resistant materials have reduced the need for dry air; and electronic circuitry has been fruitful in the design and use of "tuned" circuits that is—spaced or shaped surges of power set resonant circuits "ringing" with a series of descending electronic echoes that maintain the corona at an ozone generating energy level between pulses. This form of electronic coating has significantly reduced power consumption.

Power consumption of 20 watts per gram of ozone has been reduced to 10±.

SUMMARY OF THE INVENTION

This invention is based on the affinity of specific inert liquids for dissolving gases, and the physical/chemical characteristic of oxygen molecules acceptance of ultraviolet light energy until the normal dual molecular state of free oxygen $O_2$ is converted to the unstable energy state of ozone $O_3$.

Oxygen is first absorbed in the inert absorber liquid, preferably under a superatmospheric pressure. Greater quantities of oxygen are dissolved or absorbed in the absorber liquid when the pressure during absorption is in excess of atmospheric.

The absorber liquid, still under pressure is then passed by or through an ultraviolet radiating light source designed to provide the intensity and wavelengths of radiant energy required to energize the oxygen and convert it to ozone.

The ozone containing absorber liquid is then stored under pressure to retain the produced, dissolved ozone, for up to a (3) three day half life of ozone; 20° C., or whenever the pressure is returned to atmospheric or subatmospheric which reduces the solubility of the ozone in the absorber liquid thus releasing it for immediate use.

Heat stripping is also possible of the ozone gas from the absober liquid, but this method of stripping is damaging to the released ozone molecule.

The ozone can be used by mixing the dielectric liquid, after passing through the generator, with the waste liquid or water being treated or chemical solutions, and permit the oxidation to take place as a dual media reaction. The absorber liquid being non-miscible with water is easily separated from the water phase and recovered for reuse. The inert absorber liquids used herewith are those which have general physical/chemical properties as follows.

1. Nominal boiling points serveral times that of water.
2. Specific gravities either less than or greater than water—for easy separation.
3. Very low vapor pressures—non volatile.
4. Critical temperatures several times the boiling point of water.
5. Non-miscible with water.
6. Non-toxic to bio-organisms.
7. Stable physical/chemical characteristics at ambient as well as elevated (600° F.) temperatures; and at superatmospheric pressures-(10± atmos.).
8. Reusable for indefinite number of cycles.
9. Non-bio-degradable.
10. Non-oxidizable with ozone.
11. Have an affinity for dissolving oxygen, and other gases.
12. Dielectric.

This invention is based on the use as the absorber liquid of specific liquids, such as the fully halogen saturated hydrocarbons or mixtures thereof, commonly called fluorocarbons, which comply with the above general specifications.

Of the many dielectric liquids which meet these general conditions, the fully halogen saturated hydrocarbons or mixtures thereof, are recommended. For those versed in the arts and sciences of inert absorbent liquids for gases, many such compounds will be obvious.

The process also lends itself to the rapid oxidation of unfulfilled chemical oxygen demand gases which are entrained with the oxygen being dissolved in the absorber liquid. For example a polluting stack or ventilation vent, polluting with unfulfilled chemical oxygen demand sulphur compounds, such as $SO_2$ or $H_2S$ or mercaptans; or nitrogen oxides, such as $NO_x$; when scrubbed with the absorber liquid dissolves or absorbs these pollutants along with the oxygen; and when the absorber liquid is ultra violet light energized, the ozone first produced reacts with these unfulfilled chemical demand compounds, oxidizing then to their highest state. The balance of the energized oxygen molecules then converting to ozone. Control of the U.V. light energy applied permits production of ozone only for the oxidation of the pollutants if this is the process goal.

Mixing of the radiated absorber liquid with water then produces the mineral acid of the special pollutant gas; which being non-miscible with the absorber liquid gravity separates from the absorber liquid for recovery of both the acid and the absorber liquid.

The absorber liquid is recycled each time used as an absorber liquid.

PREFERRED EMBODIMENT

It is the intention of this invention to teach the art and science of producing ozone by dissolving oxygen gas in an inert carrier liquid and radiating the liquid with ultra violet light, thus converting a percentage of the oxygen to ozone gas also dissolved in the inert carrier liquid.

For example; to produce ozone of at least (10%) ten percent pure ozone $O_3$ and (90%) ninety percent unreacted oxygen; both as dissolved gases in an inert carrier liquid an oxygen supply is established with a capacity preferably of 10 kg per hour, when producing each 1000 grams per hour of desired pure ozone.

An inert oxygen carrier liquid is selected from the numerous liquids available to those versed in the art and science of inert liquids. For example a fully halogenated hydrocarbon which has a boiling point of 321° C. and complies with the general chemical/physical characteristics specified herein. The ability of the liquid to absorb oxygen and ozone is determined along with the temperature and pressure combination under which the designed system is to operate. For example with a selected operating temperature of 25° C. and ten (10) atmospheres, the circulation of 166.62 kg of the inert carrier liquid through a closed system provides a balanced oxygen/ozone solubility.

Preferably a dissolver vessel is used to provide the mixing and retention time for most efficient oxygen solubility in the inert carrier liquid. For example a 35 centimeter diameter vessel with an overall vertical height of 832 centimeters is charged with sufficient inert carrier liquid to fill the vessel to a depth of 722 centimeters and provide a retention time of, for example five (5) minutes. During the injection of the inert carrier liquid to the dissolving vessel oxygen is added, preferably through a mixer device such as a venturi injector.

With the mixing vessel filled to its design depth additional inert carrier liquid and gaseous oxygen is continued until the pressure in the mixing vessel reaches, for example, ten (10) atmospheres at the discharge nozzle and control valve just below the maximum liquid level; the oxygen saturated carrier liquid is transferred to the radiation system.

Surplus oxygen which has not been taken into solution in the dissolver vessel collects over the top of the inert carrier liquid, and is preferably removed by a recirculation pump which reinjects it, in parallel with the nacent oxygen, back into the injector venturi or mixing device charging the inert carrier liquid and oxygen to the dissolver vessel. In this manner, eventually one hundred percent (100%) of all oxygen injected into the system is dissolved in the carrier liquid and thence sent to the radiation system.

The radiation system is composed, preferably of high strength, special inert structural material, such as glass which permits a high percentage of the ultra violet waves in the range of 200 nanometers to 300 nanometers to pass through it. Preferably any shape configuration is acceptable which will pass a thin film of inert carrier liquid, for example 0.10 cm to 5 cm in thickness through and by the ultra violet light source.

For example ten (10); ten (10) centimeter diameter glass tubes are arranged in parallel, each to receive 16.662 kg of the inert carrier liquid in the annular space produced between concentric pairs of tubes. The pairs of concentric tubes with the interior tube having, for example a ten (10) centimeter O.D.; concentrically mounted inside a similar tube with an I.D. of eleven (11) centimeters; produces a liquid film thickness, for example, of 0.50 centimeters.

Mounting of the ten concentric tubes in parallel with a length of liquid travel through the tubes of 150 centimeters provides a retention time, preferably in excess of five seconds, for ultra-violet light radiation of the inert carrier liquid. Although the example has discussed concentric tubes, this has been done by way of explanation and in no way limits any other configuration which permits a thin film of carrier liquid be passed by the U.V. light source for the time period designed to convert the percentage of oxygen to ozone desired.

The liquid while in the radiation system is preferably under the same pressure as the inert carrier liquid was when mixed with the oxygen in the dissolver vessel.

The light source can be any radiant source of light which has sufficient intensity and wave length to excite the oxygen atoms and molecules and convert a fraction of them to ozone molecules. Preferably the light source has a great percent of its light with ultra violet wavelengths in the 200 nanometer to 300 nanometer range; with the maximum radiation at 255 nanometers.

Radiant energy is supplied preferably at a rate of not less than 120 kilocalories per mole of oxygen in the system. When the radiation system consists of concentric glass tubes as per example, the light sources are preferably tube lamps at the centerline of the pair of concentric glass tubes. When other configurations are used to pass the thin film of carrier liquid by the radiant light source, other light source configurations are equally acceptable. Those versed in the field of light and such physical/chemical reactions will have no difficulty in designing many varied type configurations meeting the requirements of efficient radiation with 255 nanometer ultra violet light for a designed duration of radiation.

Heat generated by ultraviolet and other wavelengths within the carrier liquid in the radiation system, is preferably removed by some cooling means. Those versed with ozone generation will be familiar with the art and science of cooling the radiation system, and equipment and methods available.

The radiated carrier liquid, preferably still under pressure, after leaving the radiation system, now pregnant with ozone is transformed to storage vessels and/or point of use. Ozone pregnant carrier liquid is stored in pressurized containers with not less than the same pressure as the radiation or ozonation system. Release of pressure on the containers reduces the affinity of the carrier liquid for absorbing and holding the dissolved ozone; thus is the ozone recovered for use in a gaseous state.

Waste water, and processes liquids to be treated with ozone are intimately mixed with the ozone pregnant carrier liquid, either while both are pressurized, or as the pressurized ozone pregnant carrier liquid is mixed with the process liquid as its pressure is reduced. The dissolved or released ozone reacting chemically for the purpose designed.

The inert carrier liquid, being non-miscible with these processes water, is separated therefrom, and recycled to ozone production use.

Inert carrier liquid, from which the ozone has been stripped by reduction of pressure is likewise recycled to ozone production use.

Thus it may be seen that ozone and combinations of ozone and oxygen may be produced in compact facilities and within closed circuits by oxidizing oxygen in a liquid environment. While the present invention has been described in a certain degree of particularity, it is understood that the present disclosure has been made by way of example and that changes in detail of structures may be made without departing from the spirit thereof.

What is claimed is:

1. A method for the production of ozone within a system which comprises the exciting of oxygen in a liquid environment with ultraviolet light energy comprising the steps of, injecting a dissolving vessel with an inert, dielectric absorber liquid having an affinity to dissolve oxygen, mixing gaseous oxygen with the liquid prior to or in the dissolving vessel, under pressure, passing the oxygen containing liquid through an ultraviolet light sourse, stripping the ozone from the radiated liquid for use, or mixing the liquid, pregnant with ozone with an other liquid containing chemicals which react with ozone, recycling the ozone stripped liquid for multiple use.

2. The method of claim 1 wherein the temperature within the dissolving vessel ranges from ambient to 100° C.

3. The method of claim 1 wherein the pressure within the dissolving vessel ranges from atmospheric to superatmospheric.

4. The method of claim 1 wherein the oxygen injected into the system is pure oxygen gas.

5. The method of claim 1 wherein the liquid for the dissolved oxygen is of the family of halogen saturated, hydrocarbons or mixtures thereof; which are liquids at ambient conditions of temperature and pressure.

6. The method of claim 1 wherein the oxygen is injected and mixed into the liquid.

7. The method of claim 1 wherein the liquid, pregnant with dissolved oxygen is injected into the radiation system.

8. The method of claim 1 wherein the liquid, pregnant with dissolved oxygen is radiated with ultraviolet light with wavelength from 200 nanometer to 300 nanometers.

9. The method of claim 1 wherein the ozone is stripped from the liquid pregnant with ozone, consisting of the steps of;

reducing the pressure from that used in the dissolving, radiating system, to atmospheric, or subatmospheric.

10. The method of claim 1 of dissolving contaminated gases, selected from $SO_2$ and $NO_x$ along with retained oxygen in the stripped liquid from a discharge vent, and oxidizing said contaminant gases to free non objectionable mineral acids, comprising the steps of, dissolving the contaminant gases stream in the absorber liquid, radiating the liquid pregnant with the gases
thus oxidizing dissolved oxygen to ozone,
which reacts with $SO_2$ and $NO_x$ to produce $SO_3$ and $NO_2$,
then mixing the radiated liquid with water to react with the dissolved $SO_3$ and $NO_2$ to produce $H_2SO_4$ and $HNO_3$, then, gravity separating the nonmiscible acids and carrier liquid,
salvaging or disposing of the product acid(s),
returning the liquid back to process for recycle use.

* * * * *